J. D. HUSBANDS, Jr.
Diamond Saws.
No. 146,681.  Patented Jan. 20, 1874.
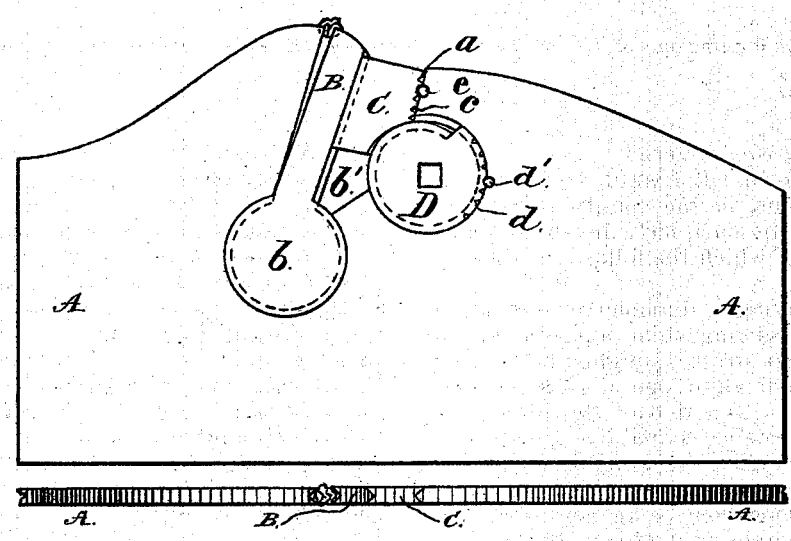
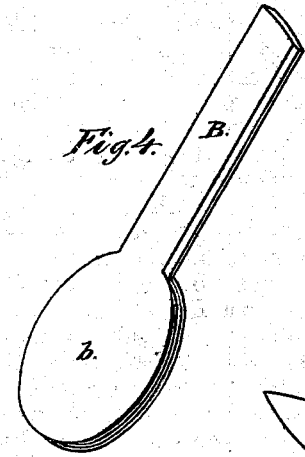
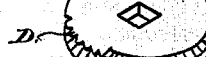
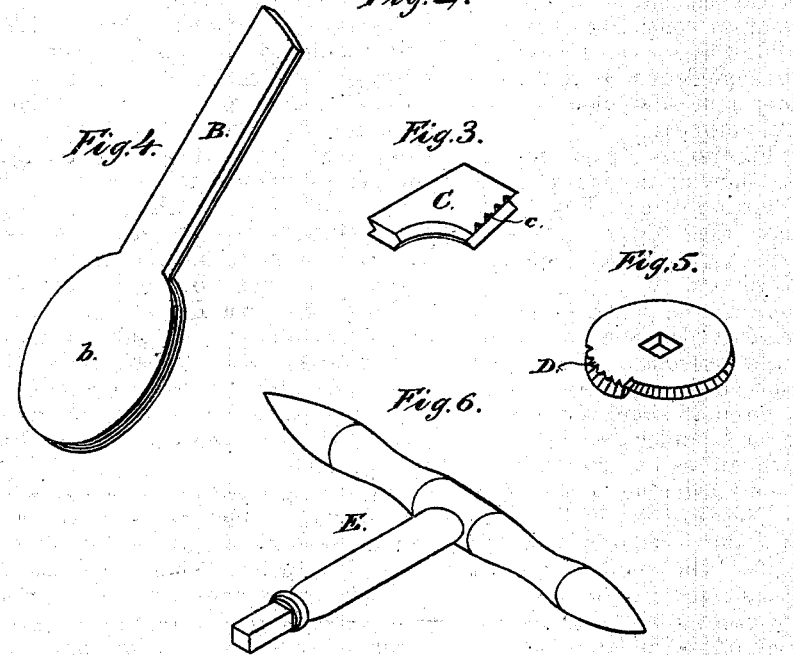
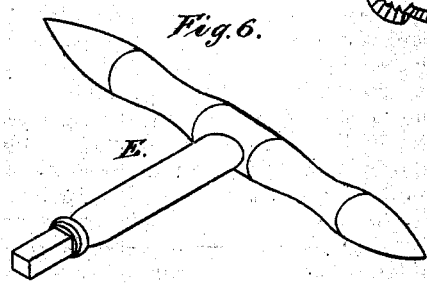
Attest.
J. W. Herthel.
Chas. Meisner.
Inventor.
Joseph D. Husbands Jr.
per Herthel & Co
Attys

UNITED STATES PATENT OFFICE.

JOSEPH D. HUSBANDS, JR., OF ST. LOUIS, MISSOURI.

IMPROVEMENT IN DIAMOND-SAWS.

Specification forming part of Letters Patent No. 146,681, dated January 20, 1874; application filed October 1, 1873.

*To all whom it may concern:*

Be it known that I, JOSEPH D. HUSBANDS, Jr., of St. Louis, in the county of St. Louis and State of Missouri, have invented an Improved Saw, of which the following is a specification:

In saws having a diamond or similar cutting point for sawing stone and similar purposes, the great strain brought upon the cutting-point, the force or operation of the saw, and especially the action of the diamond at point where same is secured, compressing the saw-plate, are difficulties which tend to loosen the diamond or cutting point, and otherwise prevent the same from being held securely in its place. Therefore, in order to take up the slack or wear thus caused and produced, the nature of my invention consists in the construction of the wedge and eccentric cam devices, and their arrangement with relation to the diamond-holder and saw-plate, as will hereinafter more fully appear.

In the drawing, Figure 1 is a part side elevation of saw-plate, showing my improved devices to hold the cutting-point. Fig. 2 is an edge view of same; Figs. 3, 4, 5, 6, perspective views, respectively, of wedge, holder, eccentric cam, and turn-key.

A is the saw-plate; B, the holder proper for holding and securing the diamond or cutting point between it and saw-plate. The holder B is of the constructive shape shown in Figs. 1 and 4, having a circular shank or neck, $b$, by means whereof said holder can be seated and secured in saw-plate, as required, with relation to a most secure fastening or holding of the cutting-point. Between the holder B and saw-plate A, as at $a$ and within the space $b'$, I provide a wedge, C. The wedge C is of the constructive shape shown in Figs. 1 and 3, having its edges V-grooved to fit the contiguous V-shaped edges of the holder B and saw-plate A at $a$. The wedge C clamps and otherwise secures the holder B to hold fast the diamond or cutting point. In order, however, to more securely clamp, tighten, and secure the wedge C and, consequently, the holder B and diamond point, I have provided the eccentric cam D. The cam D is of the constructive shape shown in Figs. 1 and 5, and is seated within a true circular space made in the saw-plate A. (See Fig. 1.) Said circular space of the saw-plate has its circular edge V-shaped to correspond with the V-grooved circular edge of the cam D, the latter being shown in Fig. 5. The object and purpose of the cam D, thus arranged, are to take up the slack or wear upon or produced by the cutting-point from time to time, and especially to fasten and secure said point at every such stage of action. This is accomplished by the cam D engaging the segmental part of the wedge C, and by tightening, wedging, and otherwise securing said wedge to follow up all slack or wear movements on part of the holder B or the diamond or cutting point.

To prevent any lateral play or possibility of a loosening action taking place on part of either or both the wedge C and the cam D, I provide one, or each, or both with notches, cogs, and the like, as at $c$ and $d$. I also provide the saw-plate, either at $c'$ and $d'$, or both, with a rivet or the like fastening device. (See Fig. 1.) The rivet or the like has its head or part welded, spread, or otherwise secured in both the saw-plate and the contiguous notches $c$ and $d$, and thus more effectually secures the wedge C and cam D. By thus riveting the cam or wedge, or both said parts, the same can be further kept in their places in the saw after every operation of resecuring or fastening. The cam D is readily operated by inserting in same the turn-key E, Fig. 6, and turning same.

The arrangement of the parts, as described and shown, enables me to drive or cause the cam to operate the wedge in direct line with the cutting-point. There is no loss of power applied, and, further, as the application of power can be increased from time to time, as required, all tendencies for the cutting-point to loosen, or on part of the fastening devices to loosen, can immediately be followed up, and an adequate security of all parts obtained.

What I claim is—

1. The combination of the saw-plate A with circular shank-holder B, wedge C, and rivet $e$, substantially as and for the purpose set forth.

2. The combination of the saw-plate A with the circular shank-holder B, wedge C, cam D, and rivet $d'$, substantially as and for the purpose set forth.

3. The combination of the saw-plate A with the square-shouldered cam D, having a series of notches $d$, and rivet $d'$, for fastening the cam in different positions as it works loose by wear, substantially as specified.

In testimony of said invention, I have hereunto set my hand.

JOSEPH D. HUSBANDS, Jr.

Witnesses:
WILLIAM W. HERTHEL,
CHAS. MEISNER.